(12) United States Patent
Mierzejewski et al.

(10) Patent No.: US 10,207,796 B2
(45) Date of Patent: Feb. 19, 2019

(54) LANDING GEAR COMPRISING A ZINC-NICKEL DEPOSIT RESISTANT TO FRETTING

(71) Applicant: SAFRAN LANDING SYSTEMS, Velizy Villacoublay (FR)

(72) Inventors: Sacha Mierzejewski, Velizy Villacoublay (FR); Romain Ottenio, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 407 days.

(21) Appl. No.: 15/198,343

(22) Filed: Jun. 30, 2016

(65) Prior Publication Data

US 2017/0001716 A1   Jan. 5, 2017

(30) Foreign Application Priority Data

Jul. 3, 2015 (FR) .................................... 15 56303

(51) Int. Cl.
| | |
|---|---|
| *B64C 25/34* | (2006.01) |
| *C22C 18/00* | (2006.01) |
| *B64C 25/58* | (2006.01) |
| *C21D 3/06* | (2006.01) |
| *C23C 22/05* | (2006.01) |
| *C25D 3/56* | (2006.01) |
| *C25D 5/36* | (2006.01) |

(Continued)

(52) U.S. Cl.
CPC .............. *B64C 25/34* (2013.01); *B64C 25/58* (2013.01); *C21D 3/06* (2013.01); *C22C 18/00* (2013.01); *C23C 22/05* (2013.01); *C25D 3/565* (2013.01); *C25D 5/36* (2013.01); *C25D 5/48* (2013.01); *C25D 5/50* (2013.01)

(58) Field of Classification Search
CPC .......... B64C 25/34; C22C 18/00; C25D 3/565
See application file for complete search history.

(56) References Cited

U.S. PATENT DOCUMENTS

| | | |
|---|---|---|
| 2,419,231 A | 4/1947 | Schantz |
| 2,851,231 A | 9/1958 | Westcott, Jr. |

(Continued)

FOREIGN PATENT DOCUMENTS

FR           1 033 176 A       7/1953

OTHER PUBLICATIONS

French Search Report for FR 1556303 dated Mar. 4, 2016.
Written Opinion for FR 1556303 dated Mar. 4, 2016.

*Primary Examiner* — Brian M O'Hara
(74) *Attorney, Agent, or Firm* — Sughrue Mion, PLLC

(57) ABSTRACT

A landing gear (1) for aircraft comprising a first pair of first and second parts (7, 8, 7', 8'), said first part (7, 7') having a steel substrate and a sliding layer (C, C') formed on this substrate, the second part (8, 8') being in sliding contact against said sliding layer (C, C') with a maximum rectilinear sliding amplitude (G, G') of less than 0.5 mm, the sliding layer (C, C') being adapted to support a surface pressure in excess of 50 MPa.
The sliding layer (C, C') is a zinc and nickel alloy comprising, in terms of percentage by weight of the alloy, between 12% and 18% nickel and the first part has a protective layer (P, P') against corrosion extending from the sliding layer (C, C'), this protective layer (P, P') being formed of said zinc and nickel alloy.

13 Claims, 2 Drawing Sheets

(51) Int. Cl.
*C25D 5/48* (2006.01)
*C25D 5/50* (2006.01)

(56) References Cited

U.S. PATENT DOCUMENTS

| | | |
|---|---|---|
| 6,676,076 B1 | 1/2004 | Davies |
| 8,048,285 B2 * | 11/2011 | Tran ........................ C25D 3/565 |
| | | 205/246 |
| 2008/0131721 A1 | 6/2008 | Tran et al. |
| 2011/0195272 A1 * | 8/2011 | Guibert-Claverie ... C25D 3/565 |
| | | 428/650 |
| 2013/0195580 A1 | 8/2013 | Kast et al. |

* cited by examiner

LANDING GEAR COMPRISING A ZINC-NICKEL DEPOSIT RESISTANT TO FRETTING

The present invention relates to the field of landing gear for aircraft.

BACKGROUND OF THE INVENTION

More particularly, the invention relates to landing gear for aircraft comprising:
- a landing gear strut extending along a main axis of the landing gear;
- at least one axle mechanically connected to a first side of the landing gear strut;
- at least one wheel rotatably mounted about said at least one axle;
- at least one damper arranged to dampen a sliding movement of said landing gear strut relative to the structure of the aircraft.

The landing gear further comprises at least one pair of first and second parts, said first part having a steel substrate and a sliding layer formed on this substrate, the second part being mounted in sliding contact against said sliding layer with a maximum rectilinear sliding amplitude of this second part against said sliding layer of the first part, strictly less than 0.5 mm, the sliding layer being adapted to support, at least during the sliding, a surface pressure in excess of 50 MPa.

When using the landing gear to support the aircraft and roll it along the ground, significant vibrations in the landing gear occur despite the use of a damper. These vibrations generate a contact wear phenomenon, also known as fretting, on the contact surfaces between the parts.

This fretting phenomenon is particularly pronounced:
- when there is a relative sliding amplitude of the parts placed in contact with one another;
- when the relative sliding amplitude is low, namely less than 0.5 mm; and
- when the surface pressure applied between these contacting parts is high, namely greater than 50 MPa.

The presence of low amplitude slippage between two parts against one other helps concentrate the wear phenomenon on a small contact area between these parts. This increases the wear effect at depth of the part and thus increases the risk of its corrosion and its cracking. This is especially true for low-alloy steel parts.

This fretting is greater as the frequency of the vibrations transmitted increases during aircraft roll-out.

In order to limit this fretting phenomenon, it is known to form a chrome sliding layer on the steel substrate of the part having a tendency to become worn or wear another part. This layer has the advantage of being a very hard material and fretting-resistant.

It has been noted that the use of chromium is sometimes not satisfactory as microcracks can pass through the chromium layer, reach the substrate and generate corrosion points likely to create incipient cracks detrimental to the mechanical strength of the corroded part.

OBJECT OF THE INVENTION

An object of the present invention is to provide an alternative landing gear for addressing, at least partially, both the question of fretting between the parts and the question of corrosion near this contact.

SUMMARY OF THE INVENTION

For this purpose, an aircraft landing gear is proposed comprising:
- a landing gear strut extending along a main axis of the landing gear;
- at least one axle mechanically connected to a first side of the landing gear strut;
- at least one wheel rotatably mounted about said at least one axle;
- at least one damper arranged to dampen a sliding movement of said landing gear strut relative to the structure of the aircraft.

This landing gear further comprises at least one pair of first and second parts, said first part having a steel substrate and a sliding layer formed on this substrate, the second part being mounted in sliding contact against said sliding layer with a maximum rectilinear sliding amplitude of this second part against said sliding layer of the first part, strictly less than 0.5 mm, the sliding layer being adapted to support, at least during the sliding, a surface pressure in excess of 50 MPa.

This landing gear according to the invention is essentially characterized wherein:
- the sliding layer is made of a zinc and nickel alloy comprising, in terms of percentage by weight of the alloy, between 12% and 18% nickel, at most 0.5% of elements other than nickel and zinc, the remainder being zinc; and wherein
- the first part also has a protective layer against corrosion extending from the sliding layer, said protective layer being formed of said zinc and nickel alloy.

The sliding layer extends to the location where the first and second parts of the pair of parts come into contact and rub when these parts slide against one other in the limit of maximum authorised rectilinear sliding amplitude.

The term "Maximum authorised rectilinear sliding amplitude" refers to the greatest rectilinear displacement distance measurable between these first and second parts connected together mechanically. Thus, the greatest relative movement authorised between these first and second parts along a direction of linear travel, while the sliding layer of the first part rubs against the second part, has an amplitude which is referred to as the "maximum rectilinear sliding amplitude of this second part against said sliding layer of the first part".

The fact that this sliding layer is made of a zinc and nickel alloy comprising, in terms of percentage by weight of the alloy, between 12% and 18% nickel, at most 0.5% of elements other than nickel and zinc, the remainder being zinc, provides a sliding layer that is particularly resistant to fretting while having a reduced risk of corrosion of the steel substrate in the event microcracks appear through the sliding layer. The zinc-nickel layer is a sacrificial layer, i.e. it preferably corrodes in relation to steel.

The alloy according to the invention has a significant Gamma crystallography phase which increases the hardness and, as a consequence, wear resistance. Thus, the sliding layer is adapted to withstand a surface pressure in excess of 50 MPa with a dry friction coefficient in the order of 0.3 or a wet-friction coefficient in the order of 0.15.

Ideally, the zinc and nickel alloy contains between 12% and 16% nickel.

With such a range of nickel between 12% and 16%, improved corrosion protection is ensured. Typically the hardness of the layer is in the order of 450 HV0.01 (hardness test at 10 grams).

Moreover, at equal roughness, this zinc nickel alloy has a lower friction coefficient than the friction coefficient of a chromium sliding layer.

Thus, when the fretting phenomenon occurs with a surface pressure in excess of 50 MPa, the sliding layer of the invention limits the friction against the second part and consequently limits wear on this second part.

Owing to its sacrificial character, the sliding layer also provides better corrosion protection than chromium on the substrate area that it covers.

The fact that this same zinc and nickel alloy is used to form the sliding layer and a corrosion protection layer outside the rectilinear fretting zone is even more advantageous as this protective layer against corrosion extends from the sliding layer, without there being any layer discontinuity.

The continuity between the friction layer and the corrosion protection layer eliminates interface/junction problems between a sliding layer and an adjacent corrosion protection layer.

Having a single alloy zinc and nickel forming both the sliding layer and the corrosion protection layer allows a single continuous layer formed from a single zinc and nickel alloy to be obtained on the substrate of the first part. This continuous layer forms a friction layer at the sliding contact area between the parts and a corrosion protection layer outside this sliding contact area.

Another advantage of the invention is that when the roughness of the steel substrate has been defined, it is possible to obtain a surface condition of the sliding layer in accordance with a target value directly after application of the sliding layer on the substrate, without having to perform an additional surfacing, polishing or grinding operation.

It is noted that when the sliding layer, made of a zinc and nickel alloy, is applied by electrodeposition bath, the surface condition of the layer thus applied is very close to the surface condition before the substrate prior to application of the sliding layer.

In a preferred embodiment, said maximum rectilinear sliding amplitude of the second part against said sliding layer of the first part is strictly less than 100 microns and preferably less than 60 microns.

The invention is particularly adapted for small sliding amplitudes that involve displacement stops close to each other, i.e. less than 100 microns. This proximity between stops can lead to increased sensitivity to fretting. Thus, the use of the zinc-nickel alloy sliding layer is especially useful for maximum sliding amplitudes less than 100 microns and preferably for sliding amplitudes less than 60 microns, preferably between 5 and 30 microns.

BRIEF DESCRIPTION OF DRAWINGS

The invention will become more apparent in light of the following description, given only by way of non-limiting example and with reference to the accompanying drawings in which.

DETAILED DESCRIPTION OF THE INVENTION

Figure 1:
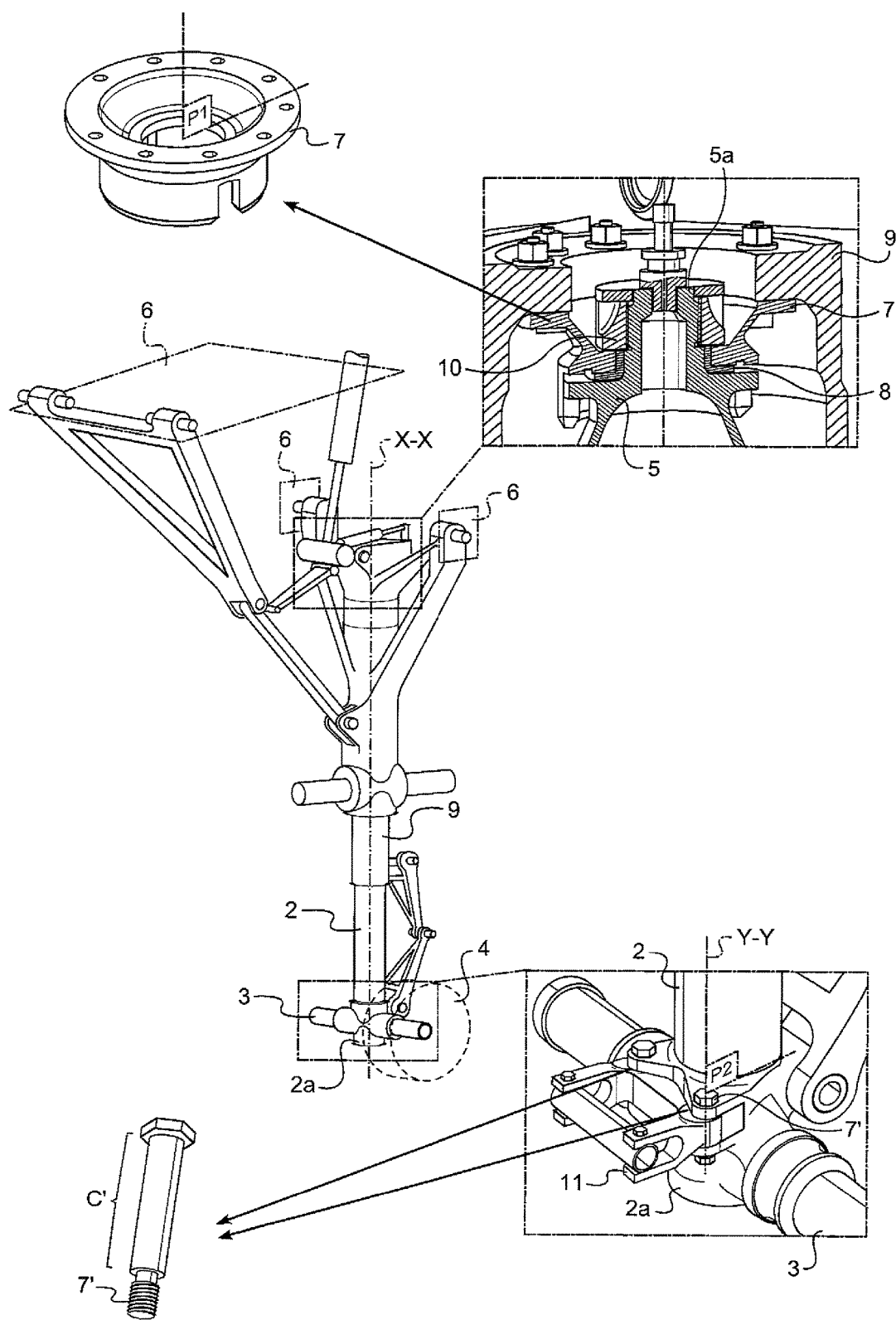
FIG. 1 shows a landing gear having a plurality of examples of first and second part pairs. For each pair, the first part is made of steel and features a sliding layer made of a zinc and nickel alloy to limit corrosion and fretting under high mechanical stress and with low sliding amplitudes between parts of the pair. In a first example, a pair of first and second parts can constitute a connection interface between a damper and a tubular housing of the landing gear. In a second example, a pair of first and second parts can constitute a connection interface between the landing gear and a towing attachment adapted and arranged to be towed by an aircraft towing vehicle.

As stated previously, the invention relates to an aircraft landing gear 1. This landing gear 1 comprises:
- a landing gear strut 2 extending along a main axis X-X of the landing gear 1;
- at least one axle 3, mechanically connected to a first side 2a of the strut 2;
- at least one wheel 4, rotatably mounted about said at least one axle 3;
- at least one damper 5 arranged to dampen a sliding movement of said landing gear strut 2 relative to the structure of the aircraft 6.

The landing gear 1 further comprises at least a first pair of first and second parts 7, 8, 7', 8'.

In this case, two examples of pairs of first and second parts will be illustrated below, one being a pair of parts forming a connection interface between damper 5 and tubular housing 9 of the landing gear and the other being a pair of parts forming an interface between the landing gear strut 2 and a towing attachment 11 to tow the aircraft using a ground vehicle.

In general, for each pair of first and second parts 7, 7', there is:
- a first part 7, 7' having a steel substrate and a sliding layer C, C' formed on this substrate;
- a second part 8, 8' mounted in sliding contact against said sliding layer C, C' with a maximum authorised rectilinear sliding amplitude G, G' of this second part 8, 8' against said sliding layer C, C', strictly less than 0.5 mm, the sliding layer C, C' being adapted to support, at least during sliding, a surface pressure in excess of 50 MPa.

In each pair:
- the sliding layer C, C' is a zinc and nickel alloy comprising, in terms of percentage by weight of the alloy, between 12% and 18% nickel, preferably between 12% and 18%, at most 0.5% of elements other than nickel and zinc, the remainder being zinc; and
- the first part also has a protective layer P, P' against corrosion extending from the sliding layer C, C', this protective layer P, P' being formed of said zinc and nickel alloy.

As indicated above, the alloy forming the sliding layer C, C' comprises at most 0.5% by weight of elements other than nickel and zinc, these other elements can be deliberately added elements or impurities, the rest of the alloy consists of zinc.

Ideally, the alloy does not contain any alloying elements other than zinc and nickel.

Preferably, the sliding layer C, C' formed on the substrate of the first part 7, 7' is arranged so that, in normal conditions of use of the landing gear 1, the sliding layer C, C' formed on the substrate of the first part 7, 7' is subject to surface pressure strictly less than 250 MPa.

In order to understand the invention, the normal conditions of use of the landing gear are all uses of the landing gear that are below predetermined maximum permissible limits regarding in-service landing gear specifications. A predetermined maximum limit may be a predetermined load limit of the landing gear, and a mechanical stress limit applicable to the landing gear, a temperature range limit applicable to parts of the landing gear, and a maximum number of operating cycles of the landing gear. Outside these normal operating conditions of the landing gear, the landing gear is likely to deteriorate.

In the latter embodiment of the invention, the surface pressure applied to the sliding layer is limited to below 250 MPa since beyond this value, the zinc-nickel alloy would significantly deteriorate, and lose its sliding and protection characteristics of the substrate and the second part against which it rubs. Thus, the location of the zinc-nickel alloy layer on the landing gear is determined according to the load level that this layer must withstand when the landing gear is in service under normal conditions of use.

In the areas where the surface pressure exceeds this maximum value, one must either use a different coating that is more resistant to surface pressure, such as chromium, or expand the bearing surface of the friction layer to reduce the surface pressure to be supported.

In the predefined conditions of use of the sliding layer C, C' made of zinc and nickel alloy, i.e. when a surface pressure is greater than 50 MPa and less than 250 MPa while having a maximum rectilinear sliding amplitude G, G' against said sliding layer C, C' strictly less than 0.5 mm, a limitation of the fretting is noted between the first and second parts while providing the first part corrosion protection.

In a preferred embodiment, the second part 8, 8' is mainly composed of bronze.

Ideally, this second part 8, 8' comprises a sliding surface in sliding contact against the sliding layer C, C' of the first part 7, 7'. This sliding surface is composed of a cadmium alloy or preferably of said zinc and nickel alloy. This embodiment reduces the friction coefficient between the first and second parts which leads to further reduction of the fretting of the first and second parts.

With equivalent roughness of flat surfaces rubbing against one another, rectilinear sliding between two layers of zinc-nickel alloy has a coefficient of friction less than sliding between a zinc-nickel alloy layer and a layer of cadmium alloy. Thus, there is less fretting in the embodiment where there is a friction between two layers of zinc-nickel alloy. This embodiment reduces the need to use an alloy other than zinc-nickel, which is advantageous in terms of the part manufacturing process.

Generally, it is preferred that the steel substrate of the first part has a tensile strength greater than 1000 MPa and preferably less than 1400 MPa. Given this high tensile strength, this first part can be used to convey high forces while being particularly adapted to resist fretting and corrosion owing to the friction layer C, C' made of a zinc and nickel alloy.

The steel substrate of the first part may be made of grade 35CD4, 300M, AISI4340, 35NCD16.

Ideally, the part 7, 7' is entirely coated with a continuous layer of zinc and nickel alloy. This continuous layer forms a sliding layer C, C' where this layer slides rectilinearly against the second part 8, 8' and forms a protective layer P, P' against corrosion in the other locations of the first part 7, 7' which are not intended to rub against the second part 8, 8'. Thus, the protective layer P, P', which is made of said zinc and nickel alloy, extends over the substrate of the first part 7, 7' which bears it, extending from the edge of the sliding layer C, C' toward the outside of this sliding layer C, C'.

Ideally, the part 8, 8' is coated with a continuous layer of zinc and nickel alloy. This continuous layer forms a sliding surface of the second part 8, 8' in the location where this surface slides rectilinearly against the first part and it forms a protective layer against corrosion in other locations of the second part 8, 8' which are not intended to rub against the first part 7, 7'. Ideally, the second part has a bronze substrate protected by a sliding surface made of a zinc and nickel alloy.

It is noted that the sliding layer C, C' preferably has a thickness between 10 and 50 microns. Similarly, the protective layer against corrosion also has a thickness between 10 and 50 microns.

Figure 2A:
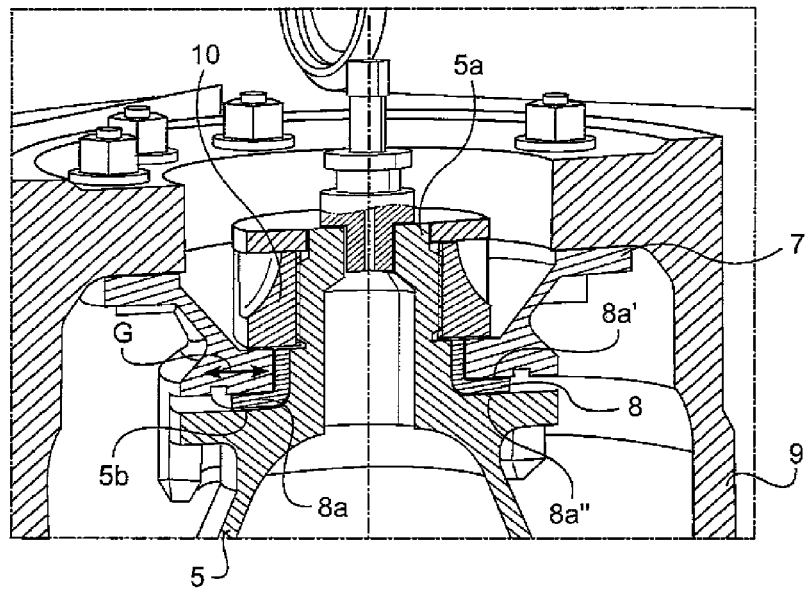
FIG. 2a illustrates a cross-sectional view, along the plane P1, detailing an example of a pair of parts visible in FIG. 1. This pair forms a connection interface between the damper and tubular housing of the landing gear.
Figure 2B:
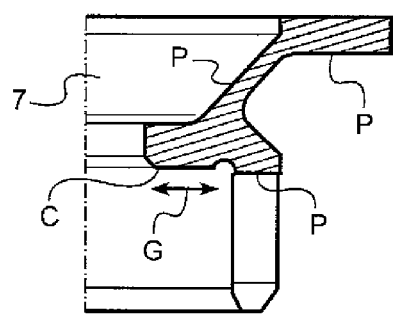
FIG. 2b is a cross-sectional view of the first part of the FIG. 2a which shows the sliding layer C enabling the sliding G to take place.

In reference to FIGS. 1, 2a, 2b, a first pair of first and second parts 7, 8 of the general type mentioned above will now be presented. Here, this first pair is used as a connection interface between the damper 5 of the landing gear and a housing 9 of the landing gear.

In this use, the tubular housing 9 is arranged to be connected to the aircraft structure 6, here symbolised by dotted lines. This housing 9 can be directional in the case where the landing gear is steerable.

The landing gear strut 2 is slidably mounted within the tubular housing 9 and the damper 5 extends at least partially inside the tubular housing 9 for damping a relative movement of the landing gear strut 2 in relation to the tubular housing 9.

Here, this first pair of first and second parts 7, 8 forms a positioning interface of an upper body of the damper 5 in relation to the tubular housing 9.

The first part 7 is secured inside the tubular housing 9 by bolting. In this case, for reasons of lightness, the tubular housing 9 is made of 7010 or 7050 type aluminium.

The upper body of the damper 5 has a cylindrical head 5a which passes through a bore passing through the second part 8 so as to be centred therein. A portion of the second part 8 is placed inside a bore passing through the first part 7 while an annular shoulder 8a of the second part 8 extends outwardly from the second part 8. This annular shoulder 8a has faces opposite one another 8a', 8a". One of these faces 8a' of the annular shoulder 8a is planar and abuts flatly against the sliding layer C formed on the substrate of the first part 7 to slide thereon. The other of these faces 8a" of the annular shoulder 8a abuts against a complementary face 5b formed outside of the upper body of the damper 5.

The bores passing through the first and second parts are arranged coaxially with respect to one another and with respect to the main axis X-X of the landing gear.

The portion of the second part 8 placed inside the bore passing through the first part 7 is adjusted to enable, in relation to the bore passing through the first part 7, radial clearance less than 60 microns and preferably between 5 and 30 microns. This radial clearance is perpendicular to the bearing surface between the first and second parts 7, 8. The maximum rectilinear sliding amplitude of the second part 8 against said sliding layer C of the first part 7 is therefore at most equal to this radial clearance. This radial clearance therefore defines said maximum authorised rectilinear sliding amplitude G of this second part 8 against said sliding layer C. The surface pressure applied on the sliding layer corresponds to the compression force applied by the damper on the housing 9 via the sliding layer C divided by the surface area of this layer C. This pressure is frequently higher than 50 MPa and the sliding layer is thus designed to be able to accept a maximum load between 50 MPa and 250 MPa without risk of deterioration.

The cylindrical head 5a of the upper body of the damper 5 is externally threaded. A nut 10 is threaded onto this head 5a to tighten the first part 7 with its sliding layer C and the annular shoulder 8a of the second part 8 between this nut 10 and said complementary face 5b formed on the outside of the upper body of the damper 5.

Tightening the nut helps maintain constant contact between the sliding layer C of the first part 7 and the second part 8.

In this embodiment of FIGS. 2a and 2b, a functional sliding clearance is possible along a plane perpendicular to the axis X-X with a rectilinear sliding capacity G less than 100 microns along the sliding layer C. The layer C reduces fretting between the first and second parts while protecting the first part against corrosion.

As the first part 7 is rigidly secured to the tubular housing 9, on the one hand, and the second part 8 is rigidly secured to the upper body of the damper, on the other hand, the only relative movement authorised between the housing 9 and the body 5 consists of sliding against the sliding layer provided for this purpose, without risk of damaging the housing or the damper.

Figure 3A:
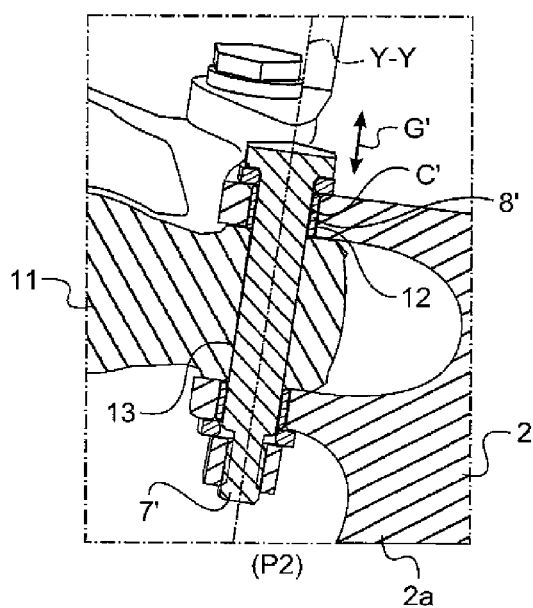
FIG. 3a illustrates a cross-sectional view, along the plane P2, detailing another example of a pair of parts visible in FIG. 1. This pair is a connection interface between the landing gear strut and a towing attachment provided for towing the aircraft during roll-out.
Figure 3B:
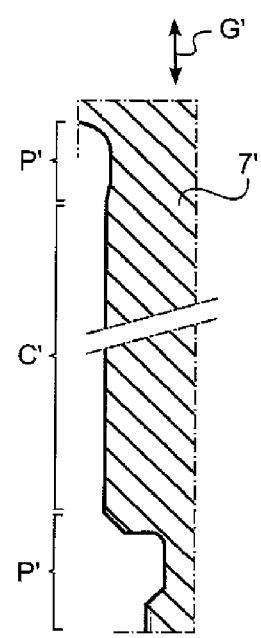
FIG. 3b is a cross-sectional view of the first part 7' visible in FIG. 3a. In this FIG. 3a, the sliding layer C' can be seen around and along this first part 7' to allow the sliding G' to take place. Here, this first part 7' is in the form of a connecting pin and more particularly a bolt.

In reference to FIGS. 1, 3a, 3b, another first pair of first and second parts 7', 8' of the general aforementioned type mentioned will now be presented. Here, this first pair is used as a connection interface between the landing gear strut 2 and a towing attachment 11 for the aircraft.

More particularly, the first part 7' is a connecting pin 7' connecting the landing gear strut 2 to a towing attachment 11 adapted and arranged to be towed by means of an aircraft towing vehicle.

The sliding layer C' formed on the substrate of the first part 7' forms a straight cylindrical layer extending along the connecting pin 7'. The connecting pin 7' extends in at least one bore 12, passing through the landing gear strut 2 and at least one bore 13 passing through said towing attachment 11.

Here, the sliding layer C' transmits the towing forces from the aircraft to the landing gear strut while accepting a slight movement between the attachment 11 and the strut 2. As the friction is localised on the zinc nickel friction layer, the risk of wear of the attachment 11 and the strut 2 is limited.

The rectilinear sliding G' of the second part 8' against the sliding layer C' of the first part 7' is a sliding movement that is parallel to a longitudinal direction Y-Y along which extends said connecting pin 7' forming said first part 7'. Here, it is not a question of plane-on-plane friction as in the previous example, but rather of friction between these cylindrical annular surfaces caused by the coaxial rectilinear sliding G' of the cylinders.

The second part 8' thus forms a bushing 8' fit tightly inside said at least one bore passing through the aircraft strut 2.

This bushing preferably has a bronze substrate and sliding surface made of cadmium alloy or preferably a zinc and nickel alloy formed on the bronze substrate, to be facing the sliding layer C'.

The connecting pin 7' slides inside said bushing 8' within the limit of a maximum sliding amplitude that forms said maximum rectilinear sliding amplitude G' of this second part 8' against the sliding layer C' of the first part 7'. Ideally, this clearance is less than 100 microns and is preferably between 0.016 and 0.052 microns; it is ideally 50 microns.

As stated previously, when towing the aircraft, the layer C' can be compressed with surface pressure in excess of 50 MPa while supporting sliding G' less than 0.5 mm.

Besides this fretting associated with the sliding movement of the connecting pin 7', additional fretting is the result of slight rotational movements of the connecting pin 7' in relation to the bores through which it passes.

As in the previous application, the layer C' makes it possible to limit wear by fretting while limiting corrosion of the first part 7'.

A methodology will now be presented for applying a sliding layer C, C' made of a zinc and nickel alloy on a first part 7, 7' in order to protect it from wear.

The first steel part is immersed in an alkali bath containing zinc and nickel in the form of ions and an electrical potential is applied between an electrode immersed in the bath and the first steel part.

Using an alkaline bath helps limit the risk of deterioration, by acid etching, of the first part during the electrolytic deposition of the layer of zinc and nickel alloy. This alkaline bath can be obtained by adding to the bath a solution of sodium hydroxide and/or potassium hydroxide, nickel in the form of nickel sulphate, zinc in the form of zincate and complexing agents required for the complexing of the zinc and the nickel as amines such as diethylenetriamine and organic additives such as brightening or levelling agents.

Typically, the first part is immersed in the bath to act as a cathode; fixed anodes immersed in the bath are used to deposit on the outer parts of the first part 7, 7', requiring no special tools. If necessary, depending on the geometry of the first part, other anodes may be used to form additional tools placed opposite zones of the first part that are difficult to access. To limit local excess thicknesses, it is also possible to arrange shields and/or current thieves opposite portions of the first part.

This tool, consisting of anodes, shields and current thieves, allows a uniform thickness to be achieved during the deposition process. The deposition completion time and the current density imposed between the anode and the first part immersed in the bath define the final thickness of the zinc-nickel layer obtained.

These tools, time parameters and current density are adjusted to obtain a final predetermined layer thickness C, C' without requiring rework by polishing or grinding.

Preferably, prior to the deposition of the layer on the first part, the surface of the steel substrate is prepared to adapt the roughness according to a target roughness to be obtained on the layer C, C'.

Typically, this surface preparation involves degreasing followed by mechanical or chemical surface activation, by means of sandblasting for example, to improve the adhesion of the zinc-nickel layer.

This step improves the adhesion of the Zn—Ni layer on the steel.

The layer of zinc and nickel alloy applied by immersing can also be passivated in a solution containing trivalent chromium, for example.

This passivation improves the corrosion protection afforded by the Zn—Ni layer deposited on the first part.

According to a particular embodiment of the method for manufacturing a landing gear strut according to the invention, a step is implemented for degassing hydrogen potentially occluded in the steel, this degassing step consisting of placing the strut in an oven for at least 12 hours while maintaining the oven at a temperature of 190° C. plus or minus 14° C. This degassing step is designed to remove the embrittling hydrogen which is potentially occluded in the steel substrate.

The method for depositing the layer of zinc and nickel alloy presented above with reference to the first part is of course applicable to any other component such as a second part 8, 8', optionally made of bronze coated with Zn—Ni alloy.

The invention claimed is:

1. A landing gear (1) for aircraft comprising:
   a landing gear strut (2) extending along a main axis (X-X) of the landing gear (1);
   at least one axle (3), mechanically connected to a first side (2a) of the strut (2);
   at least one wheel (4), rotatably mounted about said at least one axle;
   at least one damper (5) arranged to dampen a sliding movement of said landing gear strut (2) on a sliding layer relative to the structure of the aircraft (6);
   the landing gear (1) further comprises at least one pair of first and second parts (7, 8, 7'8,8'), said first part (7, 7') having a steel substrate and the sliding layer (C, C') formed on this substrate, the second part (8, 8') being mounted in sliding contact against said sliding layer (C, C') with a maximum rectilinear sliding amplitude (G, G') of this second (8, 8') part against said sliding layer (C, C') of the first part (7, 7'), less than 0 5 mm, the sliding layer (C, C') being adapted to support, at least during the sliding, a surface pressure in excess of 50 MPa, wherein:
   the sliding layer (C, C') is made of a zinc and nickel alloy comprising, in terms of percentage by weight of the alloy, between 12% and 18% nickel, at most 0.5% of elements other than nickel and zinc, the remainder being zinc; and wherein
   the first part also has a protective layer (P, P') against corrosion extending from the sliding layer (C, C'), this protective layer (P, P') being formed of said zinc and nickel alloy.

2. The landing gear (1) according to claim 1, wherein the sliding layer (C, C') formed on the substrate of the first part (7, 7') is arranged so that, in normal conditions of use of the landing gear (1), the sliding layer (C, C') formed on the substrate of the first part (7, 7') is subject to surface pressure strictly less than 250 MPa.

3. The landing gear (1) according to claim 1, comprising a tubular housing (9) arranged to be connected to the aircraft structure (6), said landing gear strut (2) being slidably mounted inside this tubular housing (9) and said at least one damper (5) extending at least partially inside said tubular housing (9) for damping a relative movement of the landing gear strut (2) in relation to the tubular housing (9), said first pair of first and second parts (7, 8) forming a positioning interface of an upper body of the damper (5) in relation to the tubular housing (9).

4. The landing gear (1) according to claim 3, wherein the first part (7) is secured inside the tubular housing (9), the upper body of the damper (5) having a cylindrical head (5a) passing through a bore passing through the second part (8) so as to be centred therein, a portion of the second part being placed inside a bore passing through the first part (7) and an annular shoulder (8a) of this second part (8) extending outwardly from this second part (8), this annular shoulder (8a) having faces opposite one another (8a', 8a"), one of these faces of the annular shoulder (8a') being planar and bearing against the sliding layer (C) formed on the substrate of the first part (7) in order to slide therein, the other of these faces (8a") of the annular shoulder (8a) bearing against a complementary face (5b) formed on the outside of the upper body of the damper (5).

5. The landing gear (1) according to claim 4, wherein the portion of the second part (8) placed inside the bore passing through the first part (7) is adjusted so as to allow, relative to the bore passing through the first part (7), a radial clearance of less than 60 microns, between 5 and 3 0 microns, the maximum rectilinear sliding amplitude of the second part (8) against said sliding layer (C) of the first part (7) thus being at most equal to this radial clearance.

6. The landing gear (1) according to claim 4, wherein the cylindrical head (5a) of the upper body of the damper (5) is externally threaded and a nut (10) is threaded onto the head (5a) to tighten the first part (7) with its sliding layer (C) and the annular shoulder (8a) of the second part (8) between this nut (10) and said complementary face (5b) formed on the outside of the upper body of the damper (5).

7. The landing gear according to claim 1, wherein the first part (7') is a connecting pin (7') connecting the landing gear strut (2) to a towing attachment (11) adapted and arranged to be towed by an aircraft towing vehicle, the sliding layer (C) formed on the substrate of the first part (7') being a straight cylindrical layer extending along the connecting pin (7'), the connecting pin (7') extending in at least one bore (12) passing through the landing gear strut (2) and in at least one bore (13) passing through said fastener towing attachment (11).

8. The landing gear according to claim 7, wherein said rectilinear sliding (G') of the second part (8') against the sliding layer (C') of the first part (7') is a sliding movement that is parallel to a longitudinal direction (Y-Y) along which extends said connecting pin forming said first part (7').

9. The landing gear according to claim 7, wherein the second part (8') is a bushing (8') fit tightly inside said at least one bore passing through the aircraft strut (2), the connecting pin (7') being slidable inside said bushing (8') in the limit of a maximum sliding amplitude which comprises said maximum rectilinear amplitude sliding amplitude (G') of said second part (8') against said sliding layer (C') of the first part (7').

10. The landing gear according to claim 1 wherein the second part (8, 8') is composed of bronze.

11. The landing gear according to claim 1 wherein the second part (8, 8') comprises a sliding surface in sliding contact against the sliding layer (C, C') of the first part (7, 7'), the sliding surface of this second part (8, 8') being composed of a cadmium alloy or of said zinc and nickel alloy.

12. The landing gear according to claim 1, wherein said zinc and nickel alloy contains between 12% and 16% nickel.

13. The landing gear according to claim 1, said maximum rectilinear sliding amplitude of the second part against said sliding layer of the first part is strictly less than 100 microns and less than 60 microns.

* * * * *